US010852859B2

(12) United States Patent
Tan et al.

(10) Patent No.: US 10,852,859 B2
(45) Date of Patent: Dec. 1, 2020

(54) SYSTEM AND METHOD OF UTILIZING PERIPHERALS

(71) Applicant: Dell Products L.P., Round Rock, TX (US)

(72) Inventors: Geroncio Ong Tan, Austin, TX (US); Mark R. Ligameri, Santa Rosa, FL (US); Danilo O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 16/041,568

(22) Filed: Jul. 20, 2018

(65) Prior Publication Data

US 2020/0026367 A1    Jan. 23, 2020

(51) Int. Cl.

| | |
|---|---|
| G06F 3/039 | (2013.01) |
| G06F 3/0354 | (2013.01) |
| G06F 3/038 | (2013.01) |
| G06F 1/3234 | (2019.01) |
| G06F 3/0488 | (2013.01) |
| G06F 3/041 | (2006.01) |
| G06F 3/0482 | (2013.01) |
| G06F 3/0484 | (2013.01) |
| G06F 3/0362 | (2013.01) |
| H02J 50/00 | (2016.01) |

(52) U.S. Cl.
CPC .......... *G06F 3/0393* (2019.05); *G06F 1/3265* (2013.01); *G06F 3/038* (2013.01); *G06F 3/0362* (2013.01); *G06F 3/03543* (2013.01); *G06F 3/041* (2013.01); *G06F 3/0482* (2013.01); *G06F 3/04847* (2013.01); *G06F 3/04886* (2013.01); *H02J 50/00* (2016.02); *G06F 2203/04809* (2013.01)

(58) Field of Classification Search
CPC ................... G06F 3/0393; G06F 3/039; G06F 2203/04809
See application file for complete search history.

(56) References Cited

U.S. PATENT DOCUMENTS

| | | | |
|---|---|---|---|
| 6,496,200 B1 * | 12/2002 | Snibbe | G06F 3/016 345/156 |
| 6,710,754 B2 * | 3/2004 | Hanson | G06F 1/1601 345/2.1 |
| 6,755,533 B2 * | 6/2004 | Fraser | G06F 1/1626 353/10 |

(Continued)

*Primary Examiner* — Patrick F Marinelli
(74) *Attorney, Agent, or Firm* — Baker Botts L.L.P.

(57) ABSTRACT

In one or more embodiments, one or more systems, methods, and/or processes may determine that a peripheral is proximate to a display associated with an information handling system; may determine an area of the display that is obscured by the peripheral; may reduce power to the area of the display that is obscured by the peripheral; may determine one or more areas of the display associated with one or more respective transparent materials associated with the peripheral; may increase illumination to the one or more areas of the display; may receive, from the peripheral, touch information associated with a user touching at least one of the one or more transparent materials; may change at least a portion of information displayed by the display; may receive, from the peripheral, user input information associated with user input to the peripheral; and may change at least another portion of the information displayed.

20 Claims, 12 Drawing Sheets

(56) References Cited

U.S. PATENT DOCUMENTS

| | | | | |
|---|---|---|---|---|
| 7,057,579 B2* | 6/2006 | Hanson | G06F 1/1601 | 345/2.1 |
| 8,547,340 B2* | 10/2013 | Sizelove | B64D 11/0015 | 345/173 |
| 8,659,555 B2* | 2/2014 | Pihlaja | G06F 3/016 | 345/156 |
| 9,024,884 B2* | 5/2015 | Lengeling | G06F 3/04847 | 345/173 |
| 9,261,965 B2* | 2/2016 | King | G06F 3/016 | |
| 9,671,954 B1* | 6/2017 | Jaugilas | G06F 3/044 | |
| 9,910,515 B2* | 3/2018 | Richards | G06F 1/163 | |
| 9,925,456 B1* | 3/2018 | Hershey | G06F 3/0481 | |
| 9,952,629 B2* | 4/2018 | Chae | G06F 1/1677 | |
| 10,042,480 B2* | 8/2018 | Krahenbuhl | G06F 1/1626 | |
| 2003/0098832 A1* | 5/2003 | Fraser | G06F 1/1652 | 345/87 |
| 2003/0098845 A1* | 5/2003 | Hanson | G06F 1/1601 | 345/156 |
| 2004/0239581 A1* | 12/2004 | Hanson | G06F 1/1632 | 345/2.1 |
| 2006/0007124 A1* | 1/2006 | Dehlin | G06F 3/014 | 345/156 |
| 2006/0022956 A1* | 2/2006 | Lengeling | G06F 3/04847 | 345/173 |
| 2006/0256090 A1* | 11/2006 | Huppi | A63F 13/02 | 345/173 |
| 2007/0052617 A1* | 3/2007 | Hanson | G06F 1/1647 | 345/1.3 |
| 2008/0229194 A1* | 9/2008 | Boler | G06F 3/002 | 715/700 |
| 2010/0026635 A1* | 2/2010 | Dimitrov | G06F 3/046 | 345/173 |
| 2010/0238119 A1* | 9/2010 | Dubrovsky | G06F 1/1626 | 345/169 |
| 2013/0076614 A1* | 3/2013 | Ive | G06F 1/1677 | 345/156 |
| 2013/0258213 A1* | 10/2013 | Ek | G02F 1/1313 | 349/5 |
| 2013/0335327 A1* | 12/2013 | Solomon | G06F 1/1662 | 345/168 |
| 2013/0335364 A1* | 12/2013 | Tseng | G06F 1/16 | 345/174 |
| 2014/0111449 A1* | 4/2014 | Lee | G06F 3/039 | 345/173 |
| 2014/0247246 A1* | 9/2014 | Maus | G06F 1/1632 | 345/174 |
| 2015/0103018 A1* | 4/2015 | Kamin-Lyndgaard | G09G 5/006 | 345/173 |
| 2015/0155903 A1* | 6/2015 | Jang | H04B 1/3888 | 455/575.8 |
| 2015/0229754 A1* | 8/2015 | Won | G06F 1/165 | 455/575.8 |
| 2015/0277602 A1* | 10/2015 | Chang | G06F 1/1677 | 345/173 |
| 2015/0324060 A1* | 11/2015 | Marcus | G06F 3/04886 | 345/178 |
| 2018/0188774 A1* | 7/2018 | Ent | G06F 1/165 | |
| 2018/0191892 A1* | 7/2018 | Kim | H04M 1/185 | |
| 2018/0260346 A1* | 9/2018 | Oh | G06F 1/1641 | |
| 2019/0146629 A1* | 5/2019 | Moon | H05K 7/00 | |
| 2019/0342740 A1* | 11/2019 | Coverstone | H04W 4/90 | |
| 2020/0026367 A1* | 1/2020 | Tan | G06F 3/038 | |

* cited by examiner

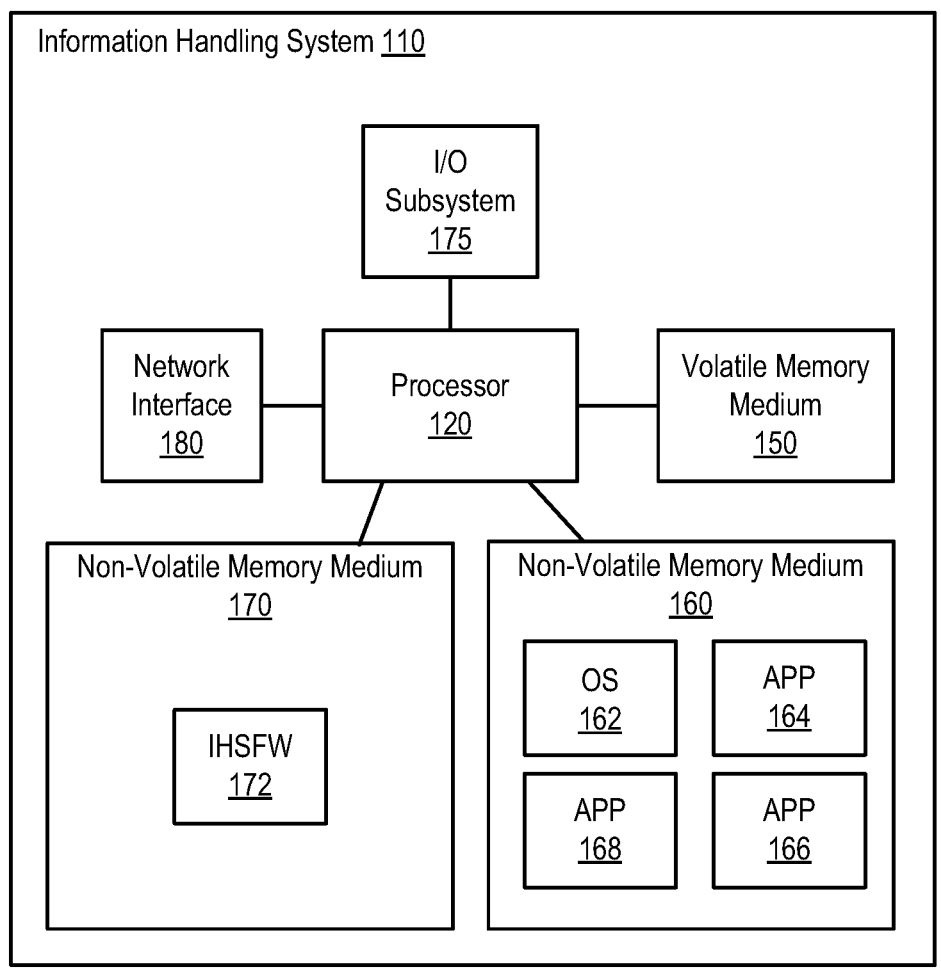
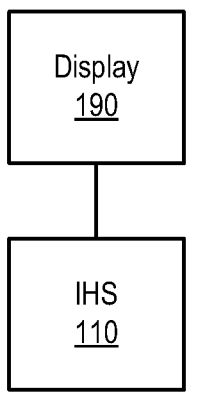
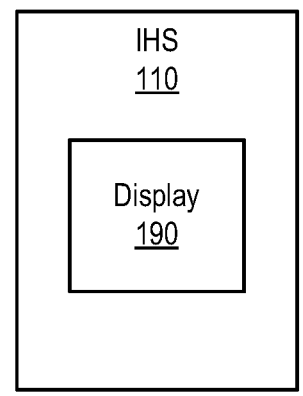
FIG. 1A
FIG. 1B
FIG. 1C

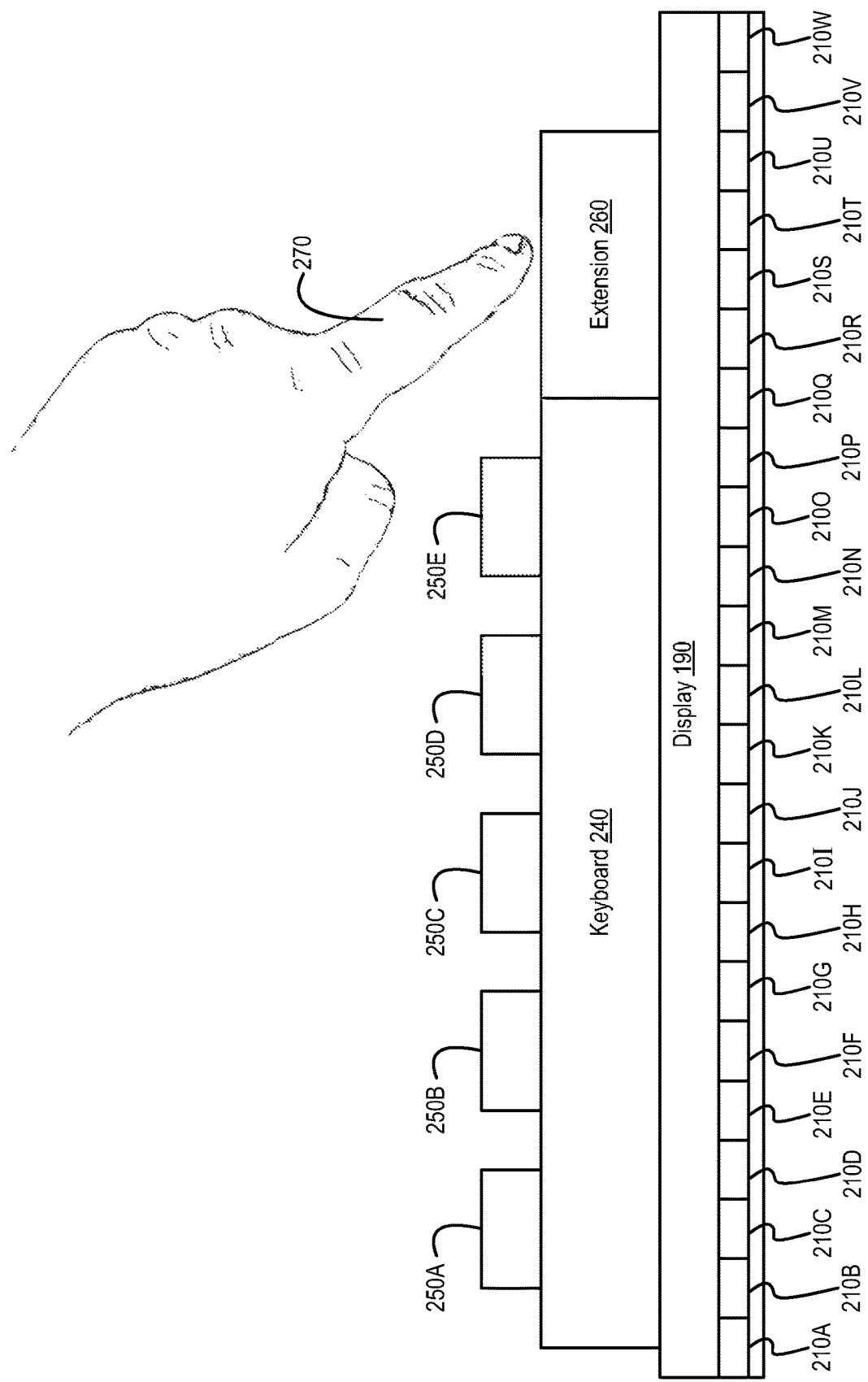

SYSTEM AND METHOD OF UTILIZING PERIPHERALS

BACKGROUND

Field of the Disclosure

This disclosure relates generally to information handling systems and more particularly to utilizing peripherals with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine that a peripheral is proximate to a display associated with an information handling system; may determine an area of the display that is obscured by the peripheral; may reduce power to the area of the display that is obscured by the peripheral; may determine one or more areas of the display associated with one or more respective transparent materials associated with the peripheral; may increase illumination to the one or more areas of the display; may receive, from the peripheral, touch information associated with a user touching at least one of the one or more transparent materials; may change at least a portion of information displayed by the display; may receive, from the peripheral, user input information associated with user input to the peripheral; and may change at least another portion of the information displayed. In one or more embodiments, the one or more systems, methods, and/or processes may further project at least one of text and a graphic onto a projection layer of one of the one or more respective transparent materials. For example, projecting the at least one of the text and the graphic onto the projection layer of one of the one or more respective transparent materials may include increasing illumination to the one or more areas of the display associated with the one or more respective transparent materials.

In one or more embodiments, the information handling system may include the display. In one or more embodiments, the display may be coupled to the information handling system. In one or more embodiments, determining that the peripheral is proximate to the display may include determining that the peripheral is in contact with the display. In one or more embodiments, at least one of receiving the touch information and receiving user input information, among others, may be performed in a wireless fashion. In one or more embodiments, the one or more systems, methods, and/or processes may further provide power to the peripheral in a wireless fashion. In one or more embodiments, the one or more systems, methods, and/or processes may further determine at least one of a selection of an icon and a swipe, among others. For example, determining at least one of a selection of an icon and a swipe, among others, may be performed in response to receiving the touch information. In one or more embodiments, the one or more systems, methods, and/or processes may further display at least one graphic associated with the peripheral. For example, displaying at least one graphic associated with the peripheral may be performed in response to determining the one or more areas of the display associated with the one or more respective transparent materials.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 1A illustrates an example of an information handling system, according to one or more embodiments;

FIGS. 1B and 1C illustrate examples of an information handling system and a display, according to one or more embodiments;

FIGS. 2A-2E illustrate examples of cross sections of a peripheral and a display, according to one or more embodiments;

DETAILED DESCRIPTION

Figure 2A:
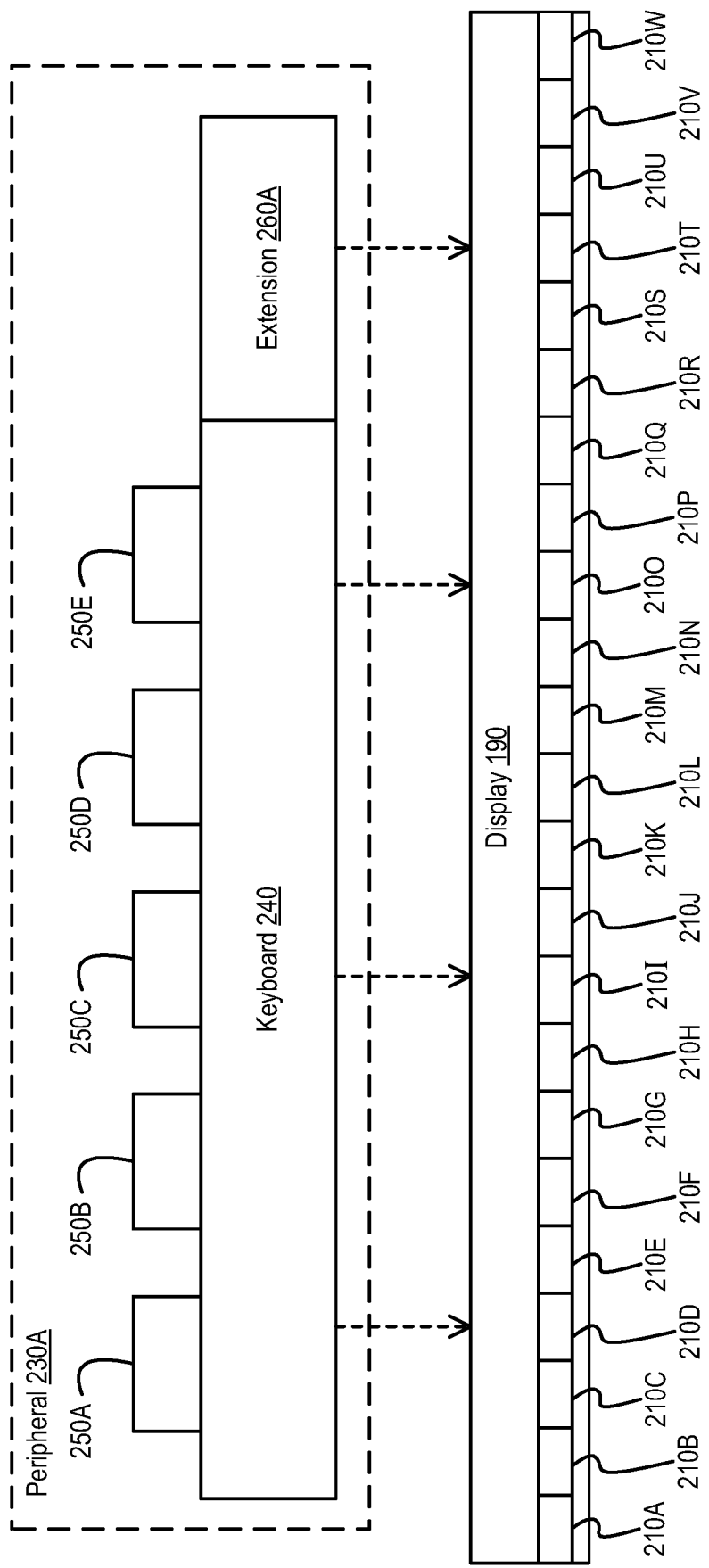

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a peripheral placed on a display may block pixels surrounding the peripheral from being viewed by a user. In one or more embodiments, an icon displayed by a display may include pixels that are proximate to and/or adjacent to the peripheral. For example, a user may have difficulty accessing the icon that includes pixels that are proximate to and/or adjacent to the peripheral as the icon may not be at the height of the peripheral. In one instance, difficulty accessing the icon that includes pixels that are proximate to and/or adjacent to the peripheral may include an odd and/or a challenging hand position to access the icon. In another instance, difficulty accessing the icon that includes pixels that are proximate to and/or adjacent to the peripheral may include a finger of the user rubbing against an edge of the peripheral when accessing the icon. In one or more embodiments, one or more transparent materials may be coupled to one or edges of a peripheral. In one or more embodiments, a peripheral may include one or more transparent materials. In one or more embodiments, light transmissions from pixels of a display may be transmitted through a transparent material associated with a peripheral. For example, a user may view pixels of the display through the transparent material associated with the peripheral. In one or more embodiments, light transmissions from pixels of a display may be projected onto a projection layer of a transparent material associated with a peripheral. For example, the projection layer may be at or proximate to a height of the peripheral. For instance, projecting light transmissions from pixels of the display may mitigate or may abate one or more issues associated with the height of the peripheral.

In one or more embodiments, a touch of a user to a transparent material, associated with a peripheral, may be determined. For example, an icon may be displayed through the transparent material, and the icon may be selected via a touch of a user. For instance, the transparent material may include circuitry and/or a material utilized in determining a touch of a user. In one or more embodiments, a peripheral may communicate with an information handling system in a wireless fashion. For example, a peripheral may communicate touch information associated with a touch of a user with an information handling system in a wireless fashion. In one or more embodiments, a peripheral may communicate with an information handling system via an industrial, scientific, and medical (ISM) radio frequency (RF) band.

In one or more embodiments, pixels of a display under an opaque portion of a peripheral may not be utilized. In one example, one or more backlights and/or one or more back light portions may not be illuminated. In one instance, if the pixels of the display under the opaque portion of the peripheral are not utilized, power may be conserved. In another instance, if the pixels of the display under the opaque portion of the peripheral are not utilized, a reduction in heat may be achieved. In another example, pixels of a display under an opaque portion of a peripheral may not be utilized on a per pixel basis. In one or more embodiments, brightness of pixels under a transparent material associated with a peripheral may be increased. In one example, brightness of one or more backlights and/or one or more back light portions may be increased. In another example, brightness of pixels of a display under the transparent material may be increased on a per pixel basis.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via nonvolatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Turning now to FIGS. 1B and 1C, examples of an information handling system and a display are illustrated, according to one or more embodiments. As shown in FIG. 1B, a display 190 may be coupled to IHS 110. In one example, display 190 may be coupled to IHS 110 in a wired fashion. In another example, display 190 may be coupled to IHS 110 in a wireless fashion. As illustrated in FIG. 1C, IHS 110 may include display 190. Although not specifically shown, display 190 may be communicatively coupled to processor 120, according to one or more embodiments. In one or more embodiments, display 190 may be a touch display. For example, display 190 may be or include an input and output device. For instance, display 190 may display information and may receive user input. In one or more embodiments, a user may provide the user input via a single or multi-touch gesture. For example, display 190 may enable a user to interact directly with information displayed by display 190, rather than using a mouse, touchpad, a trackball, or other such devices. In one instance, the user may touch display 190 with one or more fingers. In another instance, the user may touch display 190 with a stylus. In one or more embodiments, display 190 may provide touch information, based at least on the user input, to processor 120.

Turning now to FIGS. 2A-2E, examples of cross sections of a peripheral and a display are illustrated, according to one or more embodiments. As shown, a peripheral 230A may be placed proximate to display 190. In one or more embodiments, placing a peripheral 230 may include placing peripheral 230 directly onto display 190. In one or more embodiments, placing a peripheral 230 may include placing peripheral 230 directly near display 190. For example, one or more spacers and/or spacing material may be between peripheral 230 and display 190.

Figure 2B:
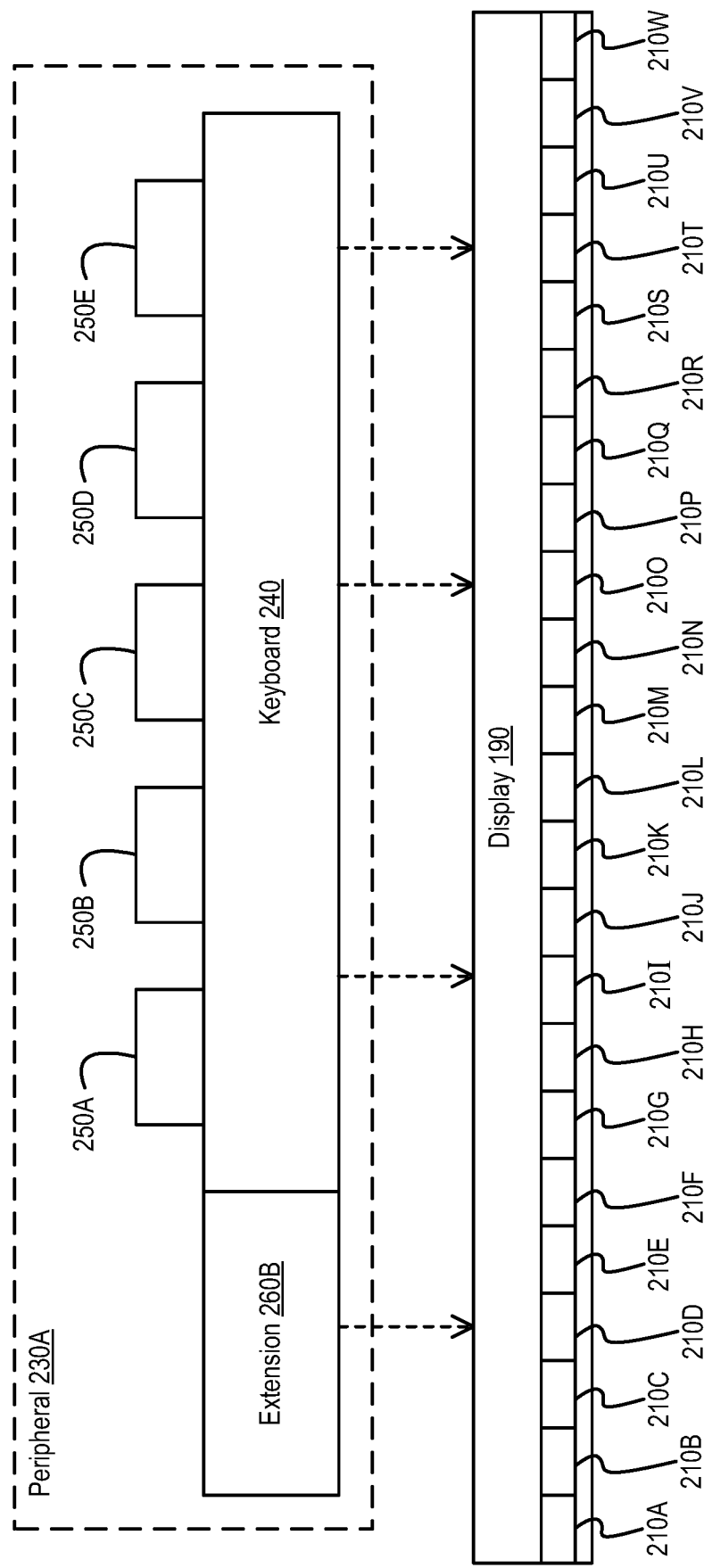
Figure 2C:
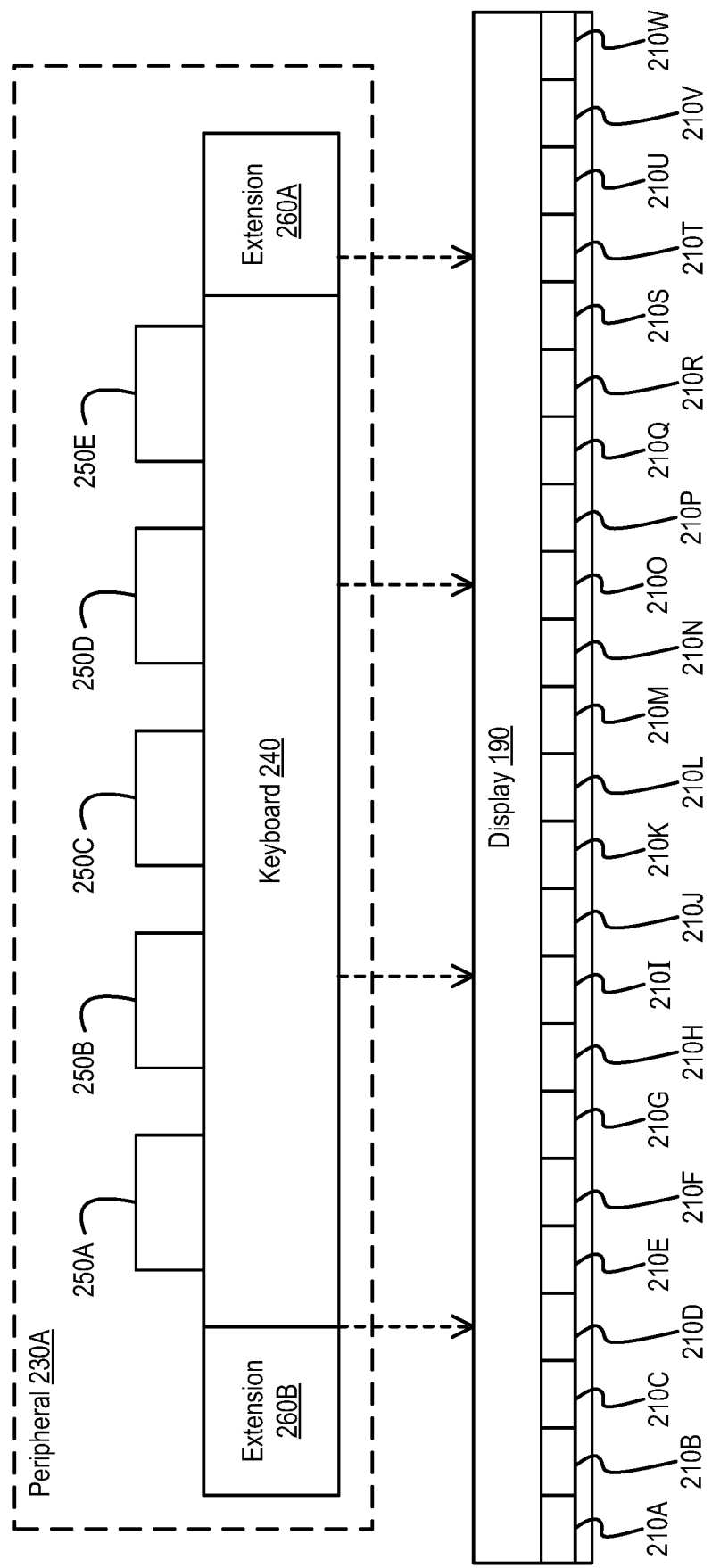

As illustrated, peripheral 230A may include a keyboard 240. As shown, keyboard 240 may include keys 250A-250E. As illustrated in FIG. 2A, peripheral 230A may include an extension 260A coupled to a first edge of keyboard 240. As shown in FIG. 2B, peripheral 230A may include an extension 260B coupled to a second edge of keyboard 240. As illustrated in FIG. 2C, peripheral 230A may include extensions 260A and 260B respectively coupled to the first edge of keyboard 240 and the second edge of keyboard 240.

In one or more embodiments, an extension 260 may include one or more transparent materials. For example, light transmissions from pixels of display 190 may be transmitted through extension 260. For instance, a user may view pixels of display 190 through extension 260. In one or more embodiments, extension 260 may include circuitry and/or a material utilized in determining a touch gesture. In one example, the circuitry and/or the material may be utilized in determining a touch gesture from a stylus. In another example, the circuitry and/or the material may be utilized in determining a touch gesture from a finger of a user. As shown in FIG. 2D, peripheral 230 may receive user input from a finger 270 of a user via extension 260.

In one or more embodiments, backlights of display 190 under an opaque portion of peripheral 260 may not be utilized. For example, backlights 210B-210P may not be utilized. For instance, backlights 210B-210P may not be illuminated. In one or more embodiments, brightness of backlights under extension 260 may be increased. For example, brightness of backlights 210Q-210W may be increased.

Figure 2E:
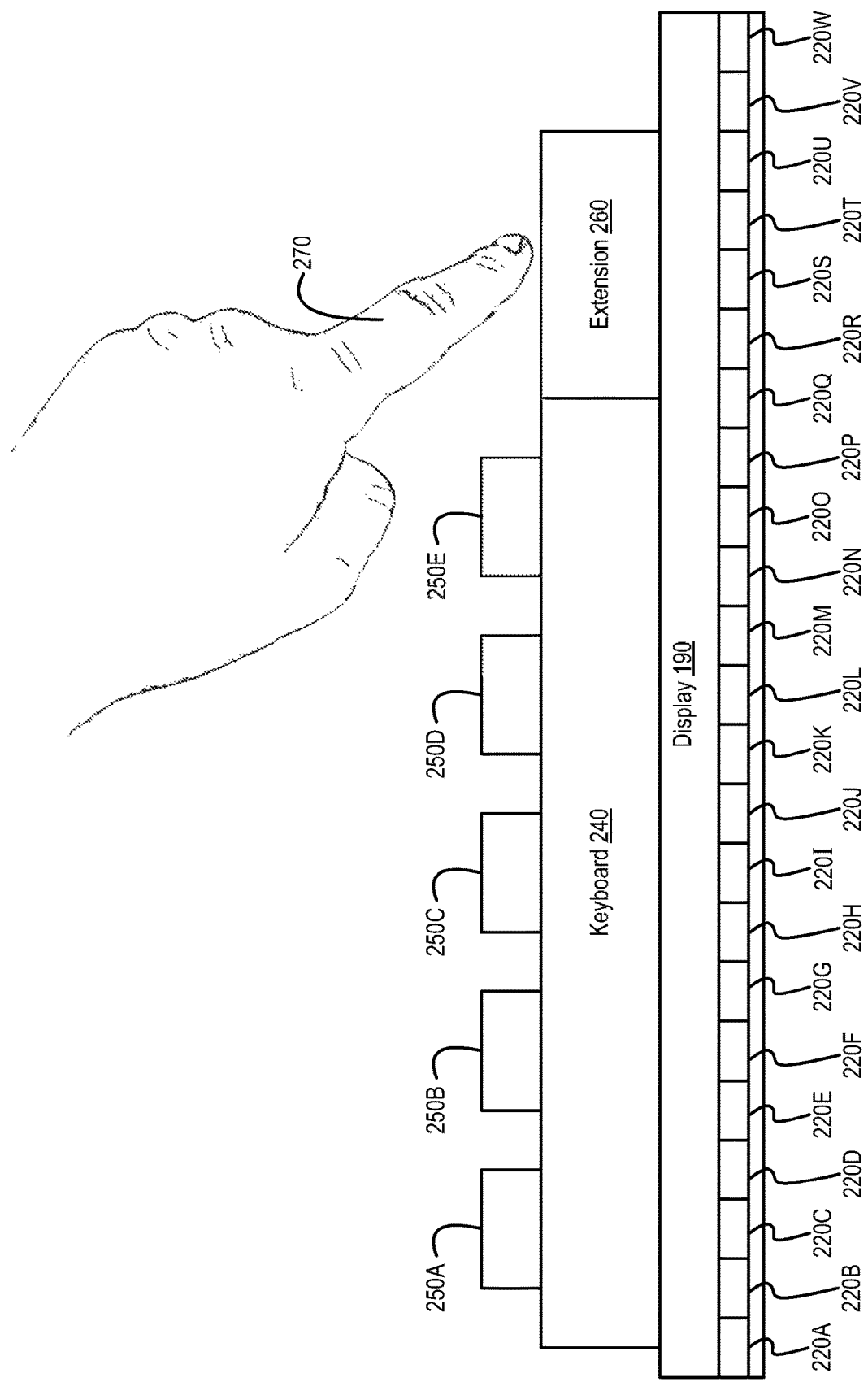

As illustrated in FIG. 2E, display 190 may include pixels 220A-220W. In one or more embodiments, pixels of display 190 under an opaque portion of peripheral 260 may not be utilized. For example, pixels 220B-220P may not be utilized. For instance, pixels 220B-220P may not be illuminated. In one or more embodiments, brightness of pixels under extension 260 may be increased. For example, brightness of pixels 220Q-220W may be increased. In one or more embodiments, a pixel 220 may include one or more light emitting diodes (LEDs). For example, the LEDs may be or include organic LEDs (OLEDs). In one instance, the OLEDs may be driven with a passive matrix (PMOLED). In another instance, OLEDs may be driven with an active matrix (AMOLED). In one or more embodiments, controlling OLEDs with an AMOLED may include utilizing a transistor backplane that may access and/or may switch each individual pixel on or off, which may permit and/or allow for higher resolution and/or larger display sizes, among others. In one or more embodiments, pixel 220 may be controlled sequentially, such as one by one. In one or more embodiments, a pixel 220 may include three LEDs. For example, a pixel 220 may include a first light emitting diode (LED) that emits light in a "red" portion of a visual spectrum, a second LED that emits light in a "green" portion of the visual spectrum, and a third LED that emits light in a "blue" portion of the visual spectrum.

Figure 2F:
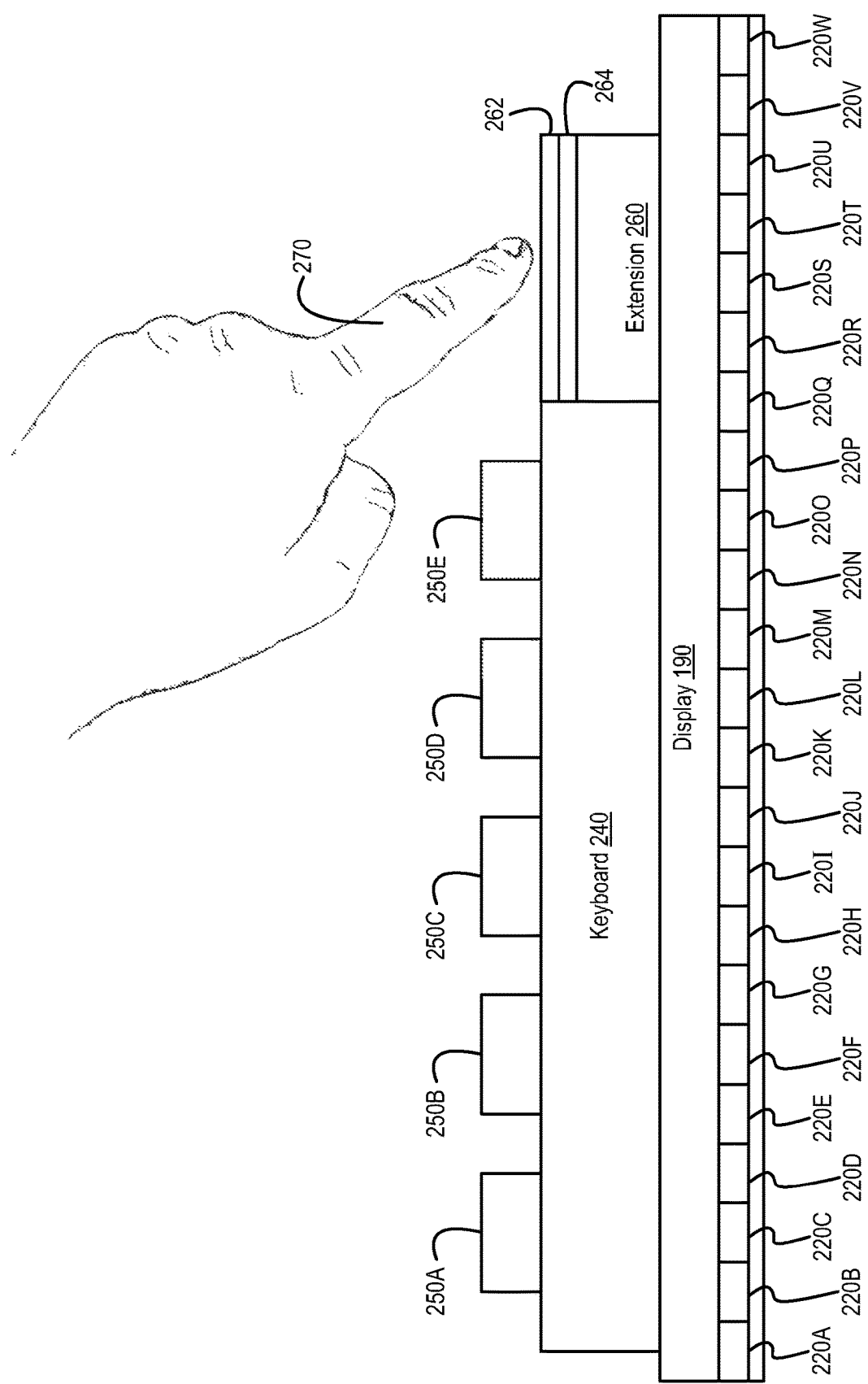
FIG. 2F illustrates an example of an extension, according to one or more embodiments.

Turning now to FIG. 2F, an example of an extension is illustrated, according to one or more embodiments. As shown, extension 260 may include a rear projection layer 262. In one or more embodiments, rear projection layer 262 may be or include a film. For example, the film may be or include a rear projection film. In one or more embodiments, rear projection layer 262 may be or include a portion of extension 260 that finely ground and/or beveled. In one or more embodiments, at least one of text and a graphic may be projected onto rear projection layer 262. For example, projecting the at least one of the text and the graphic onto rear projection layer 262 may include increasing illumination to one or more areas of display 190 associated with a transparent material of extension 260. In one or more embodiments, pixels of display 190, associated with extension 260, may project the at least one of the text and the graphic onto rear projection layer 262. For example, pixels of display 190, associated with extension 260, may generate light transmissions that are projected onto rear projection layer 262. As illustrated, extension 260 may include a transparent conductive layer 264. In one or more embodiments, transparent conductive layer 264 may be or include an oxide film. In one or more embodiments, transparent conductive layer 264 may be utilized in determining touch input from a stylus and/or finger 270.

Figure 2G:
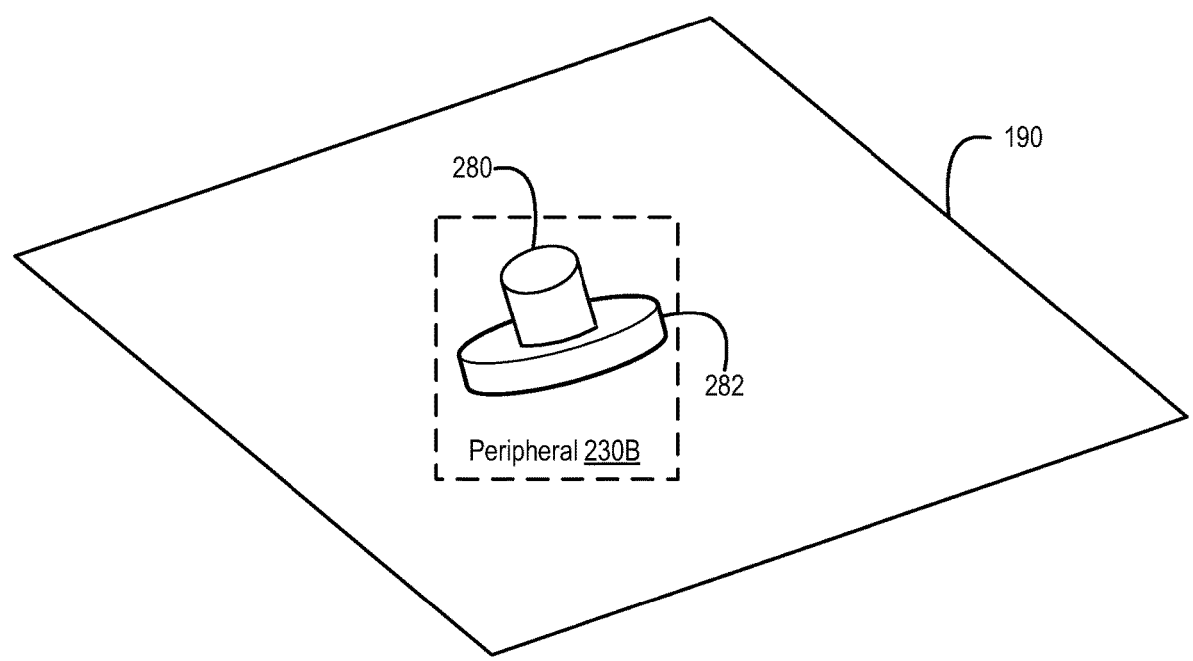
FIG. 2G illustrates an example of another peripheral and a display, according to one or more embodiments.

Turning now to FIG. 2G, an example of another peripheral and a display is illustrated, according to one or more embodiments. As shown, a peripheral 230B may include a knob 280 and an extension 282. In one or more embodiments, knob 280 may be physically turned clockwise and/or counter clockwise. In one or more embodiments, knob 280 may be depressed. For example, knob 280 may include a switch that is actuated when knob 280 is depressed. In one or more embodiments, extension 282 may include one or more structures and/or one or more functionalities as those described with reference to extension 260.

Figure 2H:
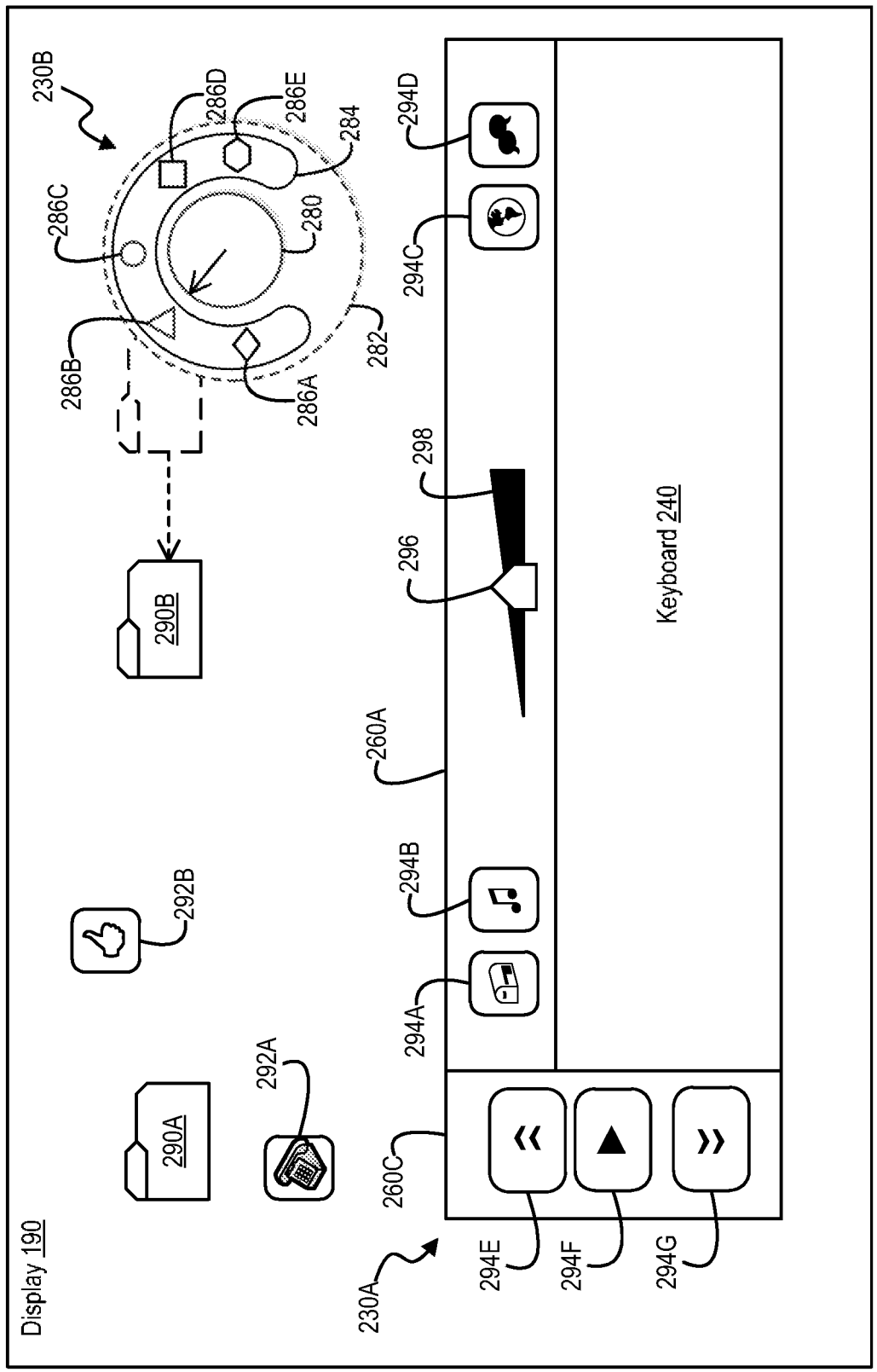
FIG. 2H illustrates an example of a display and peripherals, according to one or more embodiments.

Turning now to FIG. 2H, an example of a display and peripherals is illustrated, according to one or more embodiments. As shown, peripherals 230A and 230B may be placed on or proximate to display 190. As illustrated, display 190 may display icons 290A and 290B and icons 292A and 292B. In one or more embodiments, when peripheral 230B is placed on or proximate to display 190, icon 290B may be moved from a first position to a second position. For example, peripheral 230B may be placed over icon 292B. For instance, icon 292B may be moved from the first position to the second position in response to determining that peripheral 230B is placed over icon 292B.

As shown, a graphic 284 may be displayed via extension 282. In one example, graphic 284 may be displayed through extension 282. In another example, graphic 284 may be displayed via extension 282 by projecting graphic 284 onto a projection layer. For instance, graphic 284 may be displayed via extension 282 by projecting graphic 284 onto a rear projection layer with one or more structures and/or functionalities as those described with reference to rear projection layer 262. As illustrated, icons 286A-286E may be displayed via extension 282. In one example, icons 286A-286E may be displayed through extension 282. In another example, icons 286A-286E may be displayed via extension 282 by projecting icons 286A-286E onto a projection layer. For instance, icons 286A-286E may be displayed via extension 282 by projecting icons 286A-286E onto a rear projection layer with one or more structures and/or functionalities as those described with reference to rear projection layer 262.

As shown, icons 294A-294D and 296 may be displayed via extension 260A. In one example, icons 294A-294D and 296 may be displayed through extension 260A. In another example, icons 294A-294D and 296 may be displayed via extension 260A by projecting icons 294A-294D and 296 onto a projection layer. For instance, icons 294A-294D and 296 may be displayed via extension 260A by projecting icons 294A-294D and 296 onto rear projection layer 262. As illustrated, a graphic 298 may be displayed via extension 260A. In one example, graphic 298 may be displayed through extension 260A. In another example, graphic 298 may be displayed via extension 260A by projecting graphic 298 onto a projection layer. For instance, graphic 298 may be displayed via extension 260A by projecting graphic 298 onto rear projection layer 262. In one or more embodiments, graphic 298 may represent a volume level. For example, icon 296 may be selected to slide left and/or right along graphic 298 to select a volume level.

As shown, icons 294E-294G may be displayed via an extension 260C of peripheral 230A. In one example, icons 294E-294G may be displayed through extension 260C. In another example, icons 294E-294G may be displayed via extension 260C by projecting icons 294E-294G onto a projection layer. For instance, icons 294E-294G may be displayed via extension 260C by projecting icons 294E-294G onto rear projection layer 262.

Figure 3:
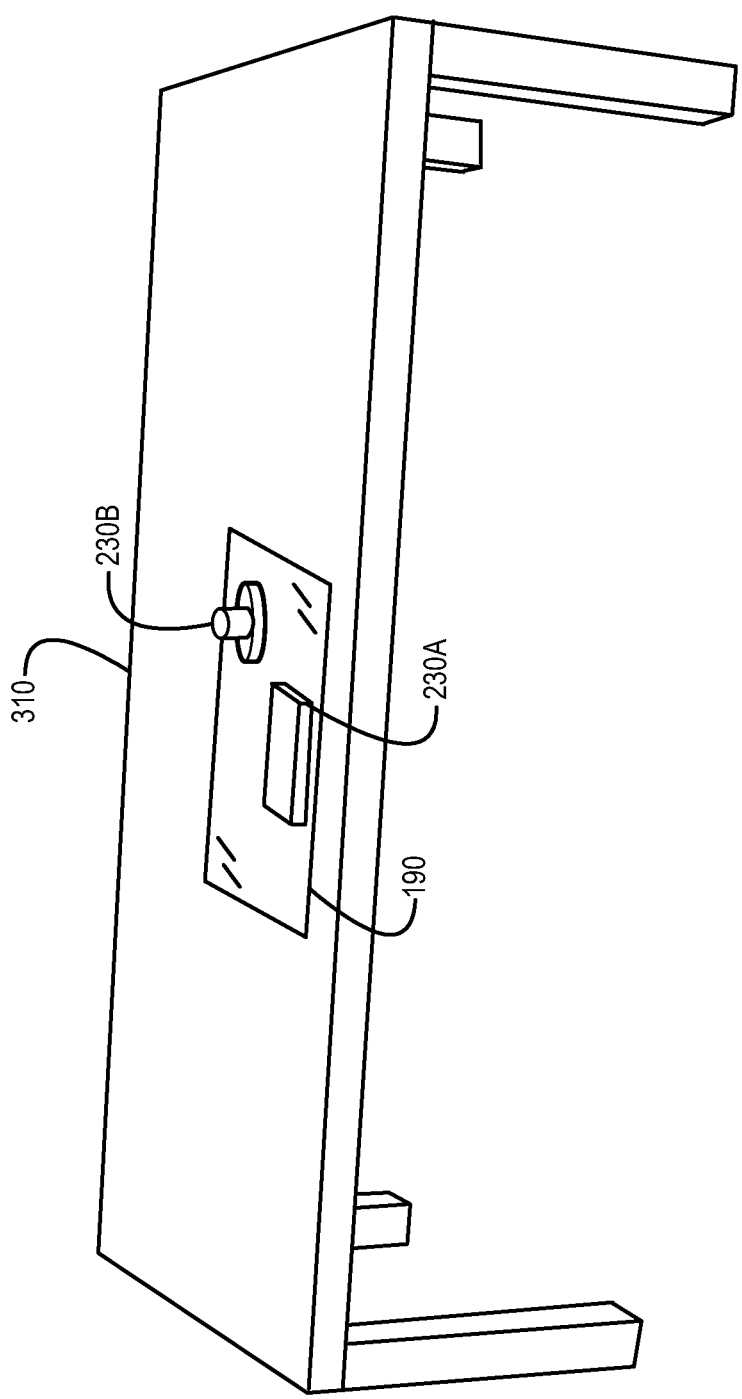
FIG. 3 illustrates another example of a display and peripherals, according to one or more embodiments.

Turning now to FIG. 3, another example of a display and peripherals is illustrated, according to one or more embodiments. As shown, a display may lay flat on or may be integrated into a table or desk 310. As illustrated, peripherals 230A and 230B may be placed on or proximate to display 190.

Figure 4:
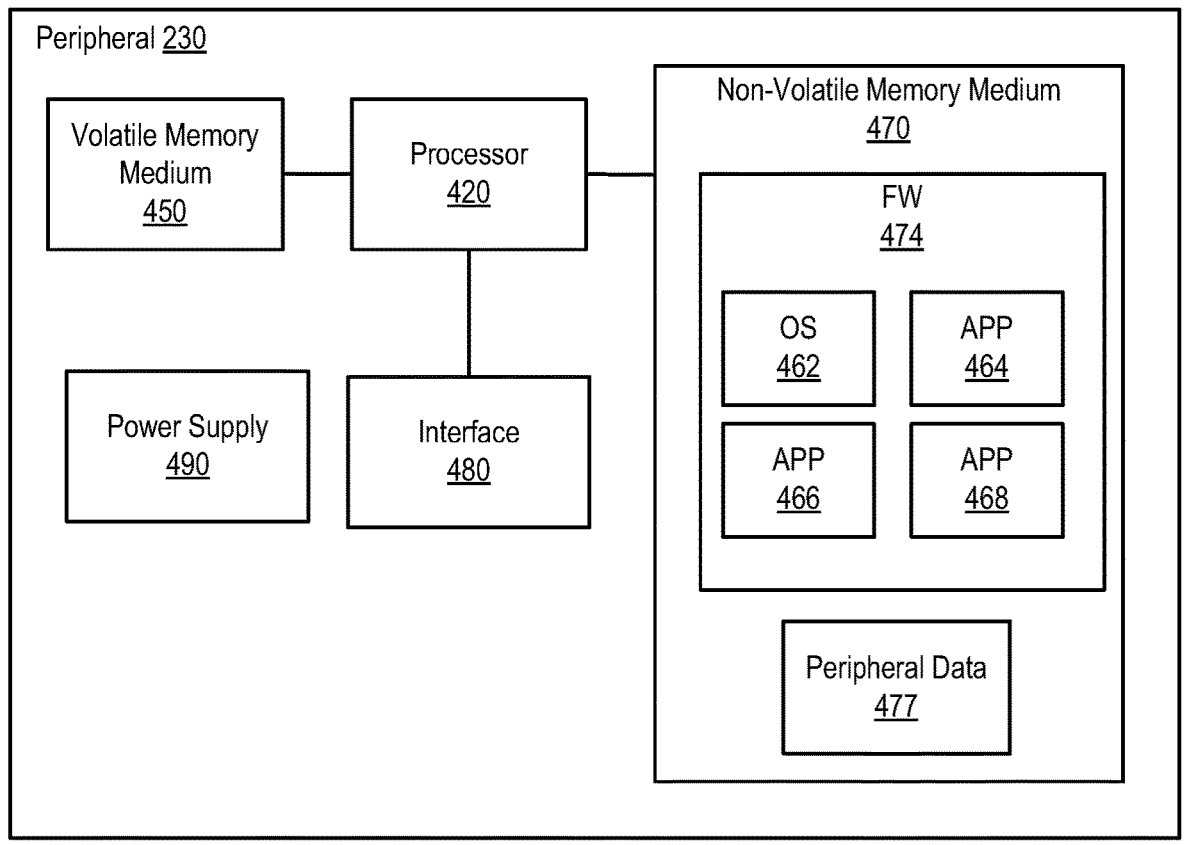
FIG. 4 illustrates an example of a peripheral, according to one or more embodiments.

Turning now to FIG. 4, an example of a peripheral is illustrated, according to one or more embodiments. As shown, peripheral 230 may include a processor 420, a volatile memory medium 450, a non-volatile memory medium 470, and an interface 480. As illustrated, non-volatile memory medium 474 may include firmware (FW) 474, which may include an OS 462 and APPs 464-468, and may include peripheral data 477. For example, OS 462 may be or include a real-time operating system (RTOS).

In one or more embodiments, interface 480 may include circuitry that enables communicatively coupling to one or more devices. In one example, interface 480 may include circuitry that enables communicatively coupling to one or more buses. In a second example, interface 480 may include circuitry that enables one or more interrupt signals to be received. In one instance, interface 480 may include general purpose input/output (GPIO) circuitry, and the GPIO circuitry may enable one or more interrupt signals to be received and/or provided via at least one interrupt line. In another instance, interface 480 may include GPIO circuitry that may enable peripheral 230 to provide and/or receive signals associated with other circuitry. In a third example, interface 480 may include circuitry that enables communicatively coupling to one or more networks. In another example, interface 480 may include circuitry that enables communicatively coupling to IHS 110. For instance, interface 480 may include circuitry that enables peripheral 230 to wirelessly communicate with IHS 110. In one or more embodiments, interface 480 may include circuitry that enables peripheral 230 to wirelessly communicate with IHS 110 via one or more ISM RF bands. For example, peripheral 230 may wirelessly communicate with IHS 110 via one or more of wireless Ethernet, IEEE 802.11, Bluetooth, Bluetooth low energy (BLE), IEEE 802.15, 6LowPan, ZigBee, IEEE 802.15.4, and near field communication (NFC), among others.

As illustrated, peripheral 230 may include a power supply 490. In one or more embodiments, power supply 490 may be or include a wireless power supply. For example, power supply 490 may receive power from display 190 or another device that may be proximate to display 190. For instance, power supply 490 may include a pickup coil that may receive power wirelessly. In one or more embodiments, power supply 490 may include an energy storage device. For example, the energy storage device may be or may include one or more of a battery and a capacitor, among others. In one instance, the battery may store energy via chemical energy. In another instance, the capacitor may store energy via an electric field.

In one or more embodiments, one or more of OS 462 and APPs 464-468 may include processor instructions executable by processor 420. In one example, processor 420 may execute processor instructions of one or more of OS 462 and APPs 464-468 via non-volatile memory medium 470. In another example, one or more portions of the processor instructions of the one or more of OS 462 and APPs 464-468 may be transferred to volatile memory medium 450, and processor 420 may execute the one or more portions of the processor instructions of the one or more of OS 462 and APPs 464-468 via volatile memory medium 450. In one or more embodiments, processor 420 may utilize peripheral data 477. In one example, processor 420 may utilize peripheral data 477 via non-volatile memory medium 470. In another example, one or more portions of peripheral data 477 may be transferred to volatile memory medium 450, and processor 420 may utilize peripheral data 477 via volatile memory medium 450.

In one or more embodiments, peripheral data 477 may store identification information associated with peripheral

230. For example, the identification information associated with peripheral 230 may be utilized to identify peripheral 230, identify one or more dimensions associated with an extension and/or an opaque area associated with peripheral 230, and/or determine one or more dimensions associated with an extension associated and/or an opaque area with peripheral 230, among others. In one or more embodiments, peripheral data 477 may store dimension information associated with peripheral 230. In one example, the dimension information associated with peripheral 230 may include one or more dimensions of an opaque area associated with peripheral 230. In another example, the dimension information associated with peripheral 230 may include one or more dimensions of an extension associated with peripheral 230. For instance, the dimension information associated with peripheral 230 may include one or more dimensions of a transparent material associated with peripheral 230. In one or more embodiments, processor 420 may execute processor instructions in implementing one or more systems, flowcharts, methods, and/or processes described herein. For example, processor 420 may execute processor instructions from one or more of memory media 450 and 470 in implementing one or more systems, flowcharts, methods, and/or processes described herein.

Figure 5:
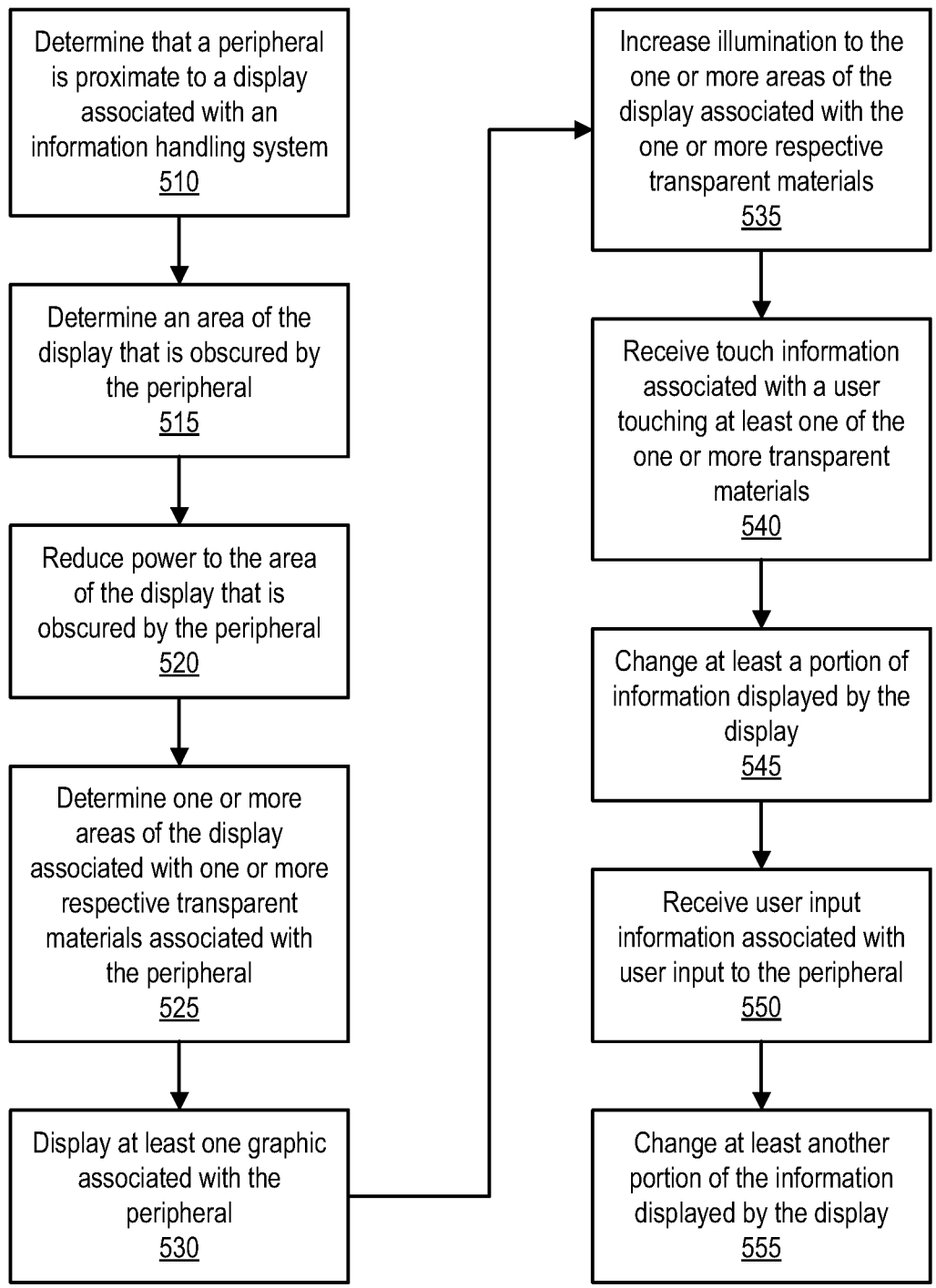
FIG. 5 illustrates an example of a method of operating an information handling system, according to one or more embodiments.

Turning now to FIG. 5, an example of a method of operating an information handling system is illustrated, according to one or more embodiments. At 510, it may be determined that a peripheral is proximate to a display associated with an information handling system. For example, it may be determined that peripheral 230 is proximate to display 190. In one or more embodiments, determining that the peripheral is proximate to the display may include determining that the peripheral is in contact with the display. For example, it may be determined that peripheral 230 is in contact with display 190.

At 515, an area of the display that is obscured by the peripheral may be determined. For example, peripheral 230 may obscure an area of display 190. For instance, the area of display 190 that is obscured by peripheral 230 may be determined. In one or more embodiments, identification information may be received from the peripheral. For example, an area of the display that is obscured by the peripheral may be determined based at least on the identification information from the peripheral.

At 520, power to the area of the display that is obscured by the peripheral may be reduced. In one or more embodiments, reducing power to the area of the display that is obscured by the peripheral may be performed in response to determining the area of the display that is obscured by the peripheral. In one or more embodiments, reducing power to the area of the display that is obscured by the peripheral may include ceasing illumination to one or more backlights and/or one or more back light portions associated with the area of the display that is obscured by the peripheral. For example, illumination of one or more of backlights 210A-210Q may be ceased. In one or more embodiments, reducing power to the area of the display that is obscured by the peripheral may include ceasing illumination to one or more pixels. For example, illumination of one or more of pixels 220A-220Q may be ceased.

At 525, one or more areas of the display associated with one or more respective transparent materials associated with the peripheral may be determined. In one or more embodiments, determining one or more areas of the display associated with one or more respective transparent materials associated with the peripheral may include determining one or more extensions of the peripheral. For example, one or more of extensions 260A-260C and 282 may be determined. In one or more embodiments, identification information may be received from the peripheral. For example, one or more areas of the display associated with one or more respective transparent materials associated with the peripheral may be determined based at least on the identification information from the peripheral.

At 530, at least one graphic associated with the peripheral may be displayed. In one or more embodiments, displaying at least one graphic associated with the peripheral may be performed in response to determining the one or more areas of the display associated with the one or more respective transparent materials. In one or more embodiments, a graphic associated with the peripheral may be or include an icon. In one example, one or more of icons 294A-294D and 296 may be displayed. In a second example, one or more of icons 294E-294G may be displayed. In a third example, graphic 298 may be displayed. In a fourth example, graphic 284 may be displayed. In another example, one or more of icons 286A-286E may be displayed.

At 535, illumination to the one or more areas of the display associated with the one or more respective transparent materials may be increased. In one or more embodiments, increasing illumination to the one or more areas of the display associated with the one or more respective transparent materials may be performed in response to determining the one or more areas of the display associated with the one or more respective transparent materials. In one or more embodiments, increasing illumination to the one or more areas of the display associated with the one or more respective transparent materials may include increasing brightness of one or more backlights. For example, brightness of one or more of backlights 210B-210D and 210S-210V may be increased. In one or more embodiments, increasing illumination to the one or more areas of the display associated with the one or more respective transparent materials may include increasing brightness of one or more pixels. For example, brightness of one or more of pixels 220Q-220V may be increased.

At 540, touch information associated with a user touching at least one of the one or more transparent materials may be received. For example, the touch information may be received from the peripheral. For instance, the touch information may be received from the peripheral in a wireless fashion. In one or more embodiments, the touch information may include one or more touch events. In one example, the one or more touch events may map to coordinates associated with display 190. In another example, the one or more touch events may map to coordinates associated with an extension (e.g., an extension 260, an extension 282, etc.). In one or more embodiments, the touch information may include information that indicates at least one of a selection of an icon and a swipe, among others. For example, at least one of a selection of an icon and a swipe, among others, may be determined based at least on the touch information. In one or more embodiments, determining at least one of a selection of an icon and a swipe, among others, may be performed in response to receiving the touch information.

At 545, at least a portion of information displayed by the display may be changed. In one or more embodiments, at least a portion of information displayed by the display may be changed in response to receiving the touch information. In one or more embodiments, an application (e.g., an APP of APPs 164-168) may be launched in response to receiving the touch information. For example, the application may change at least a portion of information displayed by display 190. In one or more embodiments, an application (e.g., an APP of APPs 164-168) may be switched in response to receiving the touch information. For example, focus from APP 162 may be switched to APP 164 in response to receiving the touch information. For instance, switching focus from APP 162 may be switched to APP 164 may change at least a portion of information displayed by display 190.

At 550, user input information associated with user input to the peripheral may be received. For example, user input information associated with user input to the peripheral may be received from the peripheral. For instance, the user input information associated with the user input to the peripheral may be received from the peripheral in a wireless fashion. In one or more embodiments, user input to the peripheral may include input to a portion of the peripheral that is not an extension. In one example, the user input to the peripheral may include an actuation of a key 250. In another example, the user input to the peripheral may include a turning of knob 280.

At 555, at least another portion of the information displayed by the display may be changed. In one or more embodiments, changing at least another portion of the information displayed by the display may be performed in response to receiving user input information. In one or more embodiments, changing at least another portion of the information displayed by the display may include displaying a glyph. For example, if a key 250 is actuated, a glyph may be displayed. For instance, the glyph may include a letter, a number, a punctuation mark, etc. In one or more embodiments, an application (e.g., an APP of APPs 164-168) may be launched in response to receiving user input information. For example, the application may change at least another portion of information displayed by display 190. In one or more embodiments, an application (e.g., an APP of APPs 164-168) may be switched in response to receiving user input information. For example, focus from APP 162 may be switched to APP 164 in response to receiving user input information. For instance, switching focus from APP 162 may be switched to APP 164 may change at least another portion of information displayed by display 190. In one or more embodiments, one or more graphics and/or one or more icons may be changed. For example, a graphic 286 may be changed and/or highlighted based at least on the user input information. For instance, the user input may be based at least on a user turning knob 280.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a first memory medium, coupled to the at least one processor, that stores instructions executable by the at least one processor, which when executed by the at least one processor, cause the information handling system to:
   determine that a peripheral is proximate to a display associated with the information handling system, the peripheral including a second memory medium, an opaque user input portion, and an extension portion coupled to an edge of the opaque user input portion, the extension portion comprising one or more respective transparent materials, and the second memory medium including peripheral data storing identification information and dimension information that are associated with the peripheral and that are usable to determine one or more dimensions of the opaque user input portion of the peripheral, one or more dimensions of the extension portion of the peripheral, and one or more dimensions of the one or more respective transparent materials;
   receive, from the peripheral and in a wireless fashion, the identification information;
   determine, based at least on the identification information received from the peripheral, a first area of the display that is obscured by the opaque user input portion of the peripheral while the peripheral is proximate to the display;
   in response to determining the first area of the display that is obscured by the opaque user input portion of the peripheral, reduce power to the first area of the display that is obscured by the opaque user input portion of the peripheral;
   determine, based at least on the identification information received from the peripheral, one or more second areas of the display associated with the one or more respective transparent materials in the extension portion of the peripheral, the one or more second areas being areas of the display for which light transmissions from pixels of the display under the extension portion of the peripheral are visible while the peripheral is proximate to the display;
   in response to determining the one or more second areas of the display associated with the one or more respective transparent materials in the extension portion of the peripheral, increase illumination to the one or more second areas of the display associated with the one or more respective transparent materials in the extension portion of the peripheral;
   receive, from the peripheral and in a wireless fashion, touch information associated with a user touching at least one of the one or more transparent materials in the extension portion of the peripheral;
   in response to receiving the touch information, change at least a portion of information displayed by the display;
   receive, from the peripheral and in a wireless fashion, user input information of a type other than touch information, wherein the user input information is associated with the opaque user input portion of the peripheral; and in response to receiving the user input information, change at least another portion of the information displayed by the display.

2. The information handling system of claim 1, wherein the instructions further cause the information handling system to:

project at least one of text and a graphic onto a projection layer of one of the one or more respective transparent materials;

wherein, to project the at least one of the text and the graphic onto the projection layer of one of the one or more respective transparent materials, the instructions further cause the information handling system to increase illumination to the one or more second areas of the display associated with the one or more respective transparent materials in the extension portion of the peripheral.

3. The information handling system of claim 1, wherein, to the determine that the peripheral is proximate to the display, the instructions further cause the information handling system to determine that the peripheral is in contact with the display.

4. The information handling system of claim 1, wherein at least one of receiving the identification information, receiving the touch information, and receiving the user input information is performed in the wireless fashion via an industrial, scientific, and medical (ISM) radio frequency (RF) band.

5. The information handling system of claim 1, wherein the instructions further cause the information handling system to:

provide power to the peripheral in a wireless fashion.

6. The information handling system of claim 1, wherein the instructions further cause the information handling system to:

in response to receiving the touch information, determine at least one of a selection of an icon and a swipe.

7. The information handling system of claim 1, wherein the instructions further cause the information handling system to:

in response to determining the one or more second areas of the display associated with the one or more respective transparent materials in the extension portion of the peripheral, display at least one graphic associated with the peripheral.

8. A method, comprising:

determining that a peripheral is proximate to a display associated with an information handling system, the peripheral including a memory medium, an opaque user input portion, and an extension portion coupled to an edge of the opaque user input portion, the extension portion comprising one or more respective transparent materials, and the memory medium including peripheral data storing identification information and dimension information that are associated with the peripheral and that are usable to determine one or more dimensions of the opaque user input portion of the peripheral, one or more dimensions of the extension portion of the peripheral, and one or more dimensions of the one or more respective transparent materials;

receiving, from the peripheral and in a wireless fashion, the identification information;

determining, based at least on the identification information received from the peripheral, a first area of the display that is obscured by the opaque user input portion of the peripheral while the peripheral is proximate to the display;

in response to the determining the first area of the display that is obscured by the opaque user input portion of the peripheral, reducing power to the first area of the display that is obscured by the opaque user input portion of the peripheral;

determining, based at least on the identification information received from the peripheral, one or more second areas of the display associated with the one or more respective transparent materials in the extension portion of the peripheral, the one or more second areas being areas of the display for which light transmissions from pixels of the display under the extension portion of the peripheral are visible while the peripheral is proximate to the display;

in response to determining the one or more second areas of the display associated with the one or more respective transparent materials in the extension portion of the peripheral, increasing illumination to the one or more second areas of the display associated with the one or more respective transparent materials in the extension portion of the peripheral;

receiving, from the peripheral and in a wireless fashion, touch information associated with a user touching at least one of the one or more transparent materials in the extension portion of the peripheral;

in response to the receiving the touch information, changing at least a portion of information displayed by the display;

receiving, from the peripheral and in a wireless fashion, user input information of a type other than touch information, wherein the user input information is associated with the opaque user input portion of the peripheral; and in response to the receiving the user input information, changing at least another portion of the information displayed by the display.

9. The method of claim 8, further comprising:

projecting at least one of text and a graphic onto a projection layer of one of the one or more respective transparent materials;

wherein the projecting the at least one of the text and the graphic onto the projection layer of one of the one or more respective transparent materials includes the increasing illumination to the one or more second areas of the display associated with the one or more respective transparent materials in the extension portion of the peripheral.

10. The method of claim 8, wherein the determining that the peripheral is proximate to the display includes determining that the peripheral is in contact with the display.

11. The method of claim 8, wherein at least one of the receiving the identification information, the receiving the touch information, and the receiving the user input information is performed in the wireless fashion via an industrial, scientific, and medical (ISM) radio frequency (RF) band.

12. The method of claim 8, further comprising:

providing power to the peripheral in a wireless fashion.

13. The method of claim 8, further comprising:

in response to the receiving the touch information, determining at least one of a selection of an icon and a swipe.

14. The method of claim 8, further comprising:

in response to the determining the one or more second areas of the display associated with the one or more respective transparent materials in the extension portion of the peripheral, displaying at least one graphic associated with the peripheral.

15. A computer-readable non-transitory memory medium that includes instructions that, when executed by at least one processor of an information handling system, cause the information handling system to:
  determine that a peripheral is proximate to a display associated with the information handling system, the peripheral including a local memory medium, an opaque user input portion, and an extension portion coupled to an edge of the opaque user input portion, the extension portion comprising one or more respective transparent materials, and the local memory medium including peripheral data storing identification information and dimension information that are associated with the peripheral and that are usable to determine one or more dimensions of the opaque user input portion of the peripheral, one or more dimensions of the extension portion of the peripheral, and one or more dimensions of the one or more respective transparent materials;
  receive, from the peripheral and in a wireless fashion, the identification information;
  determine, based at least on the identification information received from the peripheral, a first area of the display that is obscured by the opaque user input portion of the peripheral while the peripheral is proximate to the display;
  in response to determining the first area of the display that is obscured by the opaque user input portion of the peripheral, reduce power to the first area of the display that is obscured by the opaque user input portion of the peripheral;
  determine, based at least on the identification information received from the peripheral, one or more second areas of the display associated with the one or more respective transparent materials in the extension portion of the peripheral, the one or more second areas being areas of the display for which light transmissions from pixels of the display under the extension portion of the peripheral are visible while the peripheral is proximate to the display;
  in response to determining the one or more second areas of the display associated with the one or more respective transparent materials in the extension portion of the peripheral, increase illumination to the one or more second areas of the display associated with the one or more respective transparent materials in the extension portion of the peripheral;
  receive, from the peripheral and in a wireless fashion, touch information associated with a user touching at least one of the one or more transparent materials in the extension portion of the peripheral;
  in response to receiving the touch information, change at least a portion of information displayed by the display;
  receive, from the peripheral and in a wireless fashion, user input information of a type other than touch information, wherein the user input information is associated with the opaque user input portion of the peripheral; and
  in response to receiving the user input information, change at least another portion of the information displayed by the display.

16. The computer-readable non-transitory memory medium of claim 15, wherein, to the determine that the peripheral is proximate to the display, the instructions further cause the information handling system to determine that the peripheral is in contact with the display.

17. The information handling system of claim 1, wherein:
  the opaque user input portion comprises a key or a knob; and
  the user input information of a type other than touch information was input by mechanical actuation of the key or knob.

18. The computer-readable non-transitory memory medium of claim 15, wherein the instructions further cause the information handling system to:
  project at least one of text and a graphic onto a projection layer of one of the one or more respective transparent materials;
  wherein, to project the at least one of the text and the graphic onto the projection layer of one of the one or more respective transparent materials, the instructions further cause the information handling system to increase illumination to the one or more second areas of the display associated with the one or more respective transparent materials in the extension portion of the peripheral.

19. The computer-readable non-transitory memory medium of claim 15, wherein the instructions further cause the information handling system to:
  in response to receiving the touch information, determine at least one of a selection of an icon and a swipe.

20. The computer-readable non-transitory memory medium of claim 15, wherein the instructions further cause the information handling system to:
  in response to determining the one or more second areas of the display associated with the one or more respective transparent materials in the extension portion of the peripheral, display at least one graphic associated with the peripheral.

* * * * *